United States Patent
Thomas et al.

(10) Patent No.: US 8,789,390 B2
(45) Date of Patent: Jul. 29, 2014

(54) NEAR NET FUSED SILICA ARTICLES AND METHOD OF MAKING

(75) Inventors: Windsor P Thomas, Painted Post, NY (US); Daniel Warren Hawtof, Corning, NY (US)

(73) Assignee: Corning Incorporated, Corning, NY (US)

( * ) Notice: Subject to any disclaimer, the term of this patent is extended or adjusted under 35 U.S.C. 154(b) by 628 days.

(21) Appl. No.: 13/044,684

(22) Filed: Mar. 10, 2011

(65) Prior Publication Data

US 2011/0256329 A1    Oct. 20, 2011

Related U.S. Application Data

(60) Provisional application No. 61/324,502, filed on Apr. 15, 2010.

(51) Int. Cl.
   *C03B 19/06* (2006.01)
(52) U.S. Cl.
   USPC ............... 65/17.4; 65/17.3; 65/356
(58) Field of Classification Search
   USPC .................. 65/17.3, 17.4, 356
   See application file for complete search history.

(56) References Cited

U.S. PATENT DOCUMENTS

| | | | |
|---|---|---|---|
| 3,576,932 A | 4/1971 | Biddulph |
| 3,592,619 A | 7/1971 | Elmer et al. |
| 4,772,302 A | 9/1988 | Abe |
| 5,067,975 A | 11/1991 | Backer et al. |
| 5,241,615 A | 8/1993 | Amos et al. |
| 5,690,997 A | 11/1997 | Grow |
| 6,908,680 B2 | 6/2005 | Kirby et al. |
| 2007/0228211 A1 | 10/2007 | Facciano et al. |
| 2008/0176987 A1 | 7/2008 | Trevet et al. |
| 2009/0096687 A1 | 4/2009 | Gentilman et al. |
| 2009/0152135 A1 | 6/2009 | Mason et al. |

FOREIGN PATENT DOCUMENTS

| | | |
|---|---|---|
| EP | 0163752 A1 | 12/1985 |
| GB | 885118 A | 12/1961 |
| GB | 1491061 A | 11/1977 |
| JP | 02196083 A | 8/1990 |

*Primary Examiner* — Michael C Miggins
(74) *Attorney, Agent, or Firm* — Robert P. Santandrea

(57) ABSTRACT

A near-net or net shape fused silica glass article, such as a radome. The article is formed by depositing silica soot onto a mandrel having a shape that corresponds to the shape of the fused silica glass article. In some embodiments, the mandrel is inductively heated to a temperature that is sufficient to consolidate or sinter the silica soot upon deposition onto the mandrel to form fused silica glass. The fused silica glass article may have an outer layer that is under compression and/or multiple layers comprising various dopants that can alter or affect physical, mechanical, electrical, and/or optical properties.

16 Claims, 5 Drawing Sheets

(a)

(b)

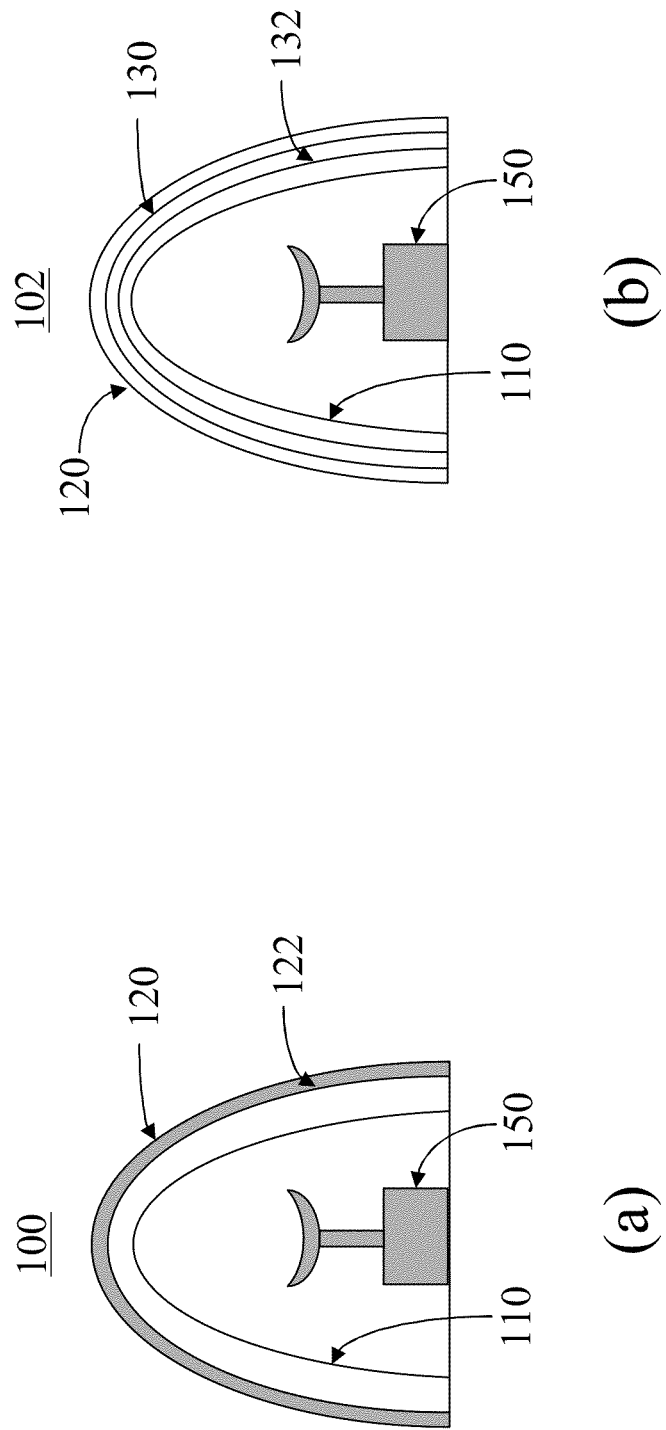

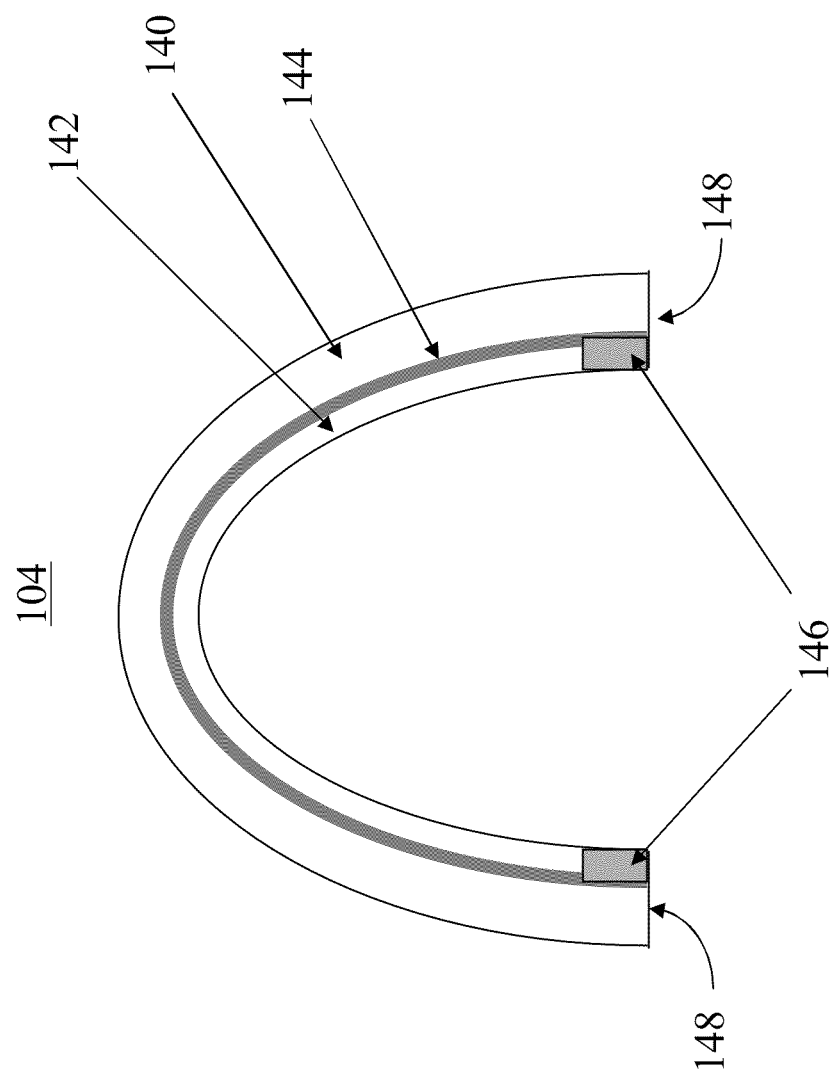

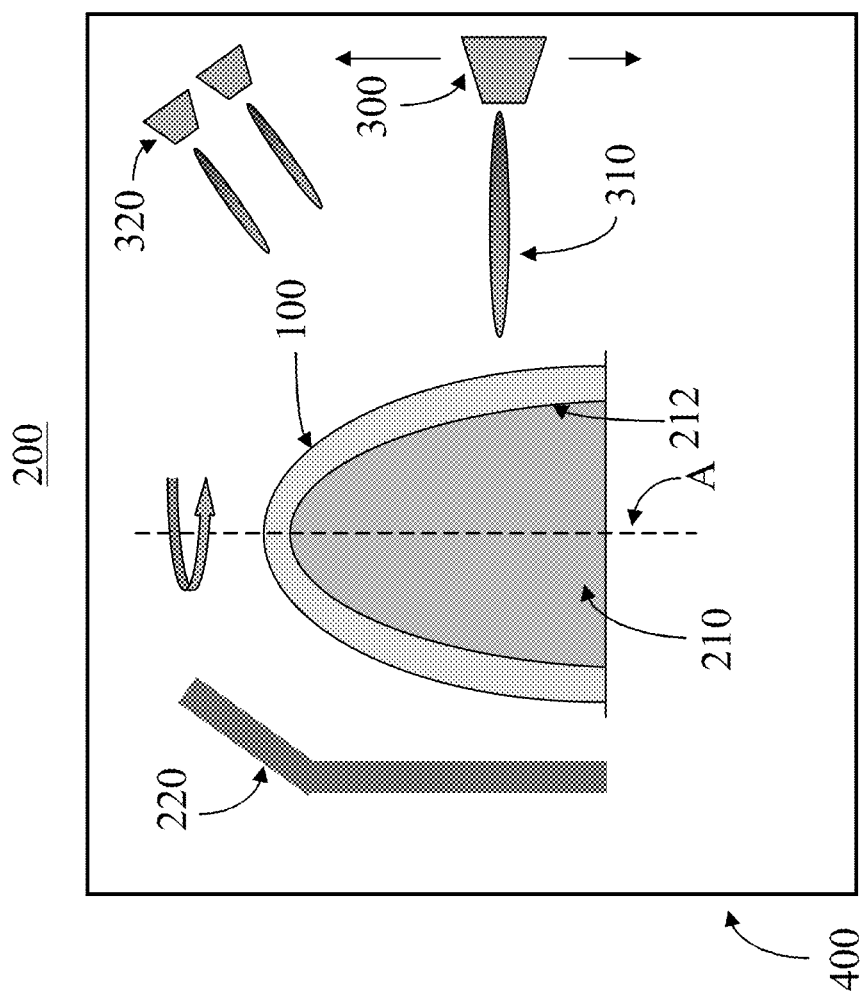

NEAR NET FUSED SILICA ARTICLES AND METHOD OF MAKING

CROSS-REFERENCE TO RELATED APPLICATIONS

This application claims the benefit of priority under 35 U.S.C. §119(e) of U.S. Provisional Application Ser. No. 61/324,502 filed on Apr. 15, 2010.

BACKGROUND

The disclosure relates to near-net or net shape fused silica glass articles. In particular, the disclosure relates to radomes for missiles and other projectiles and other fused silica glass articles, such as crucibles for silicon wafer manufacturing having high strength and low thermal expansion at high temperatures.

Hypersonic missiles travel through the atmosphere at speeds in the mach 5-7 range and higher. The nose cones (also referred to as "radomes") of such missiles house radar and other targeting sensors such as, for example, infrared (IR) sensors. At such speeds, missile components can be exposed to temperatures of about 1400° C. or greater for several minutes. Radomes must retain electrical and thermal performance under such conditions.

Radomes have been made from ceramic glasses, such as PYROCERAM® (Corning glass code 9606), having low coefficients of thermal expansion. However, such materials no longer meet the mechanical requirements associated with higher performance (e.g., increased speed, weather resistance).

Fused silica soot that has either been pressed, spin-cast, or slip-cast has also been evaluated as a radome material. While such materials have higher tolerance for heat and lower transmission losses than PYROCERAM, their permeability to moisture limits the ability of radomes made from such materials to protect electronics enclosed therein.

SUMMARY

A near-net or net shape fused silica glass articles such as a radome or three dimensional objects, such as crucibles and other "furniture" used for silicon chip processing, is provided. The article is formed by depositing silica soot onto a mandrel to form a soot body having a shape that corresponds to the shape of the fused silica glass article. The mandrel is, in some embodiments, inductively heated to a temperature that is sufficient to consolidate or sinter the silica soot upon deposition onto the mandrel to form fused silica glass. The fused silica glass article can have an outer layer that is under compression and/or multiple layers of different density or comprising various dopants that can alter or affect physical, mechanical, electrical, and/or optical properties.

Accordingly, one aspect of the disclosure is to provide a method of making a fused silica glass article having a near-net shape. The method comprises the steps of: providing a mandrel having a shape that is complementary or corresponding to the near-net shape; providing silica soot particles; and depositing the silica soot particles to form a silica soot body comprising the silica soot particles, and at least partially sintering the silica soot body in situ on the mandrel to form the fused silica glass article.

A second aspect of the disclosure is to provide a fused silica glass article. The fused silica article has an inner surface and an outer surface that are parallel to each other, wherein the outer layer is under compression.

A third aspect of the disclosure is to provide a system for forming a fused silica glass article having a near-net shape. The system comprises: an inductive heating source; a susceptor mandrel inductively coupled to the inductive heating source, wherein the susceptor mandrel has a shape corresponding to the near-net shape; and a silica soot source oriented to direct silica soot to the mandrel.

These and other aspects, advantages, and salient features will become apparent from the following detailed description, the accompanying drawings, and the appended claims.

BRIEF DESCRIPTION OF THE DRAWINGS

FIG. 1a is a schematic cross-sectional view of a first radome;

FIG. 1b is a schematic cross-sectional view of a second radome;

FIG. 1c is a schematic cross-sectional view of a third radome;

FIG. 2 is a schematic view of a system for forming a near-net shape silica glass article;

DETAILED DESCRIPTION

Figure 3:
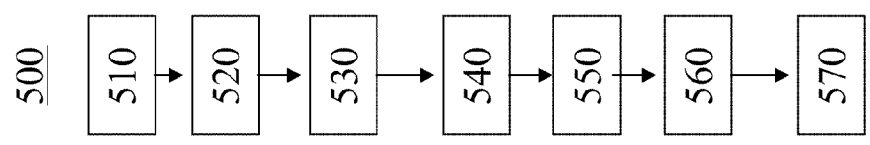
FIG. 3 is a flow chart for a method of making a near-net shape fused silica article.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range.

Referring to the drawings in general and to FIG. 1 in particular, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

Radomes require high temperature capability over sustained periods, all-weather durability, and electrical and/or thermal performance characteristics. Broadband radomes can house multiple sensors for broadband detection, as well as more effective narrowband seekers. Such radomes can, for example, allow use of multiple seeker combinations or future use of alternative seekers without necessitating replacement or redesign of the radome.

Electrical properties that are of interest in radome design include transmission loss, bandwidth, and polarization. Aerodynamic factors can include drag, heating, and ablative properties, whereas mechanical concerns include weight, shock resistance, vibration, impact resistance, and material static strength. Material selection can affect dielectric loss, operating temperature, strength, impact resistance, and manufacturing tolerances. Radio frequency (RF) signature, IR signature, and optical observance factors also play a role in radome design. From an environmental standpoint, the ability to withstand rain erosion, hail or bird impacts, static discharge, lightning strikes, temperature, moisture, fluids or fungus, and thermal shock are factors that are frequently considered. Finally, cost considerations, including costs associated with development, fabrication facilities, and testing, can also affect the design and deployment of a radome.

Fused silica crucibles and other "furniture" known in the art are used in the manufacture of silicon wafers. Such articles are of high purity and are typically cut, assembled, cast, or pressed to form a shape that is capable of holding molten silicon.

Accordingly, a fused silica glass article of either net or near-net shape is provided. The fused silica glass article can be used in those applications where high temperature stability, chemical inertness, and low thermal expansion are desired. In various embodiments, the fused silica glass article serves as a radome for projectiles such as missiles, furniture (e.g., a crucible) for high temperature processing of semiconducting materials such as silicon, wafer stepper furniture, a housing material for extreme ultraviolet radiation applications, or the like.

As used herein, the term "fused silica" refers to silica or doped silica having a density of about 50% to about 100% of that of fully densified fused silica glass.

In one embodiment, the fused silica glass article is a radome; i.e., a strong, thin shell that is used to house a radar antenna, a communications antenna, sensors, or the like. In particular embodiments, the glass article is a radome or nosecone for a projectile, such as a missile. In various embodiments, the radome is transparent to electromagnetic radiation of different wavelengths and frequencies, such as radio waves, infrared radiation, or the like. A cross-sectional view of a first radome is schematically shown in FIG. 1a. Whereas the following discussion describes the properties and structure of radomes, it is understood that the description equally applies to other net and near-net fused silica glass articles, such as, but not limited to, those described hereinabove. First radome 100 has an inner surface 110 and an outer surface 120 that are substantially parallel to each other and typically houses communication or sensor equipment 150, described above. In one embodiment, outer surface 120 comprises an outer layer 122 that is under compression, particularly at temperatures greater than room temperatures (i.e., greater than about 25° C.). Compression of outer layer 122 can be achieved by doping outer layer 122 with up to 10 wt % titania ($TiO_2$) by weight and is balanced by tensile forces within the rest of radome 100. The addition of titania proves outer layer 122 with a coefficient of thermal expansion (CTE) that approaches or equals zero. As a missile approaches and maintains high speeds, the differential in CTE between the outer surface 120 or outer layer 122 due to the presence of $TiO_2$ in outer layer 122 and the remainder of the body of first radome 100 generates a compressive stress in outer surface 120 to a depth of layer (DOL) that is equivalent to the thickness of outer layer 122. The thickness of outer layer 122 defines the degree of resistance of first radome 100 to flaws and scratching.

In some embodiments, the fused silica glass article comprises multiple layers that are substantially parallel to each other, as is schematically shown for a second radome 102 in FIG. 1b. The composition of the fused silica glass article/radome 100 can vary slightly from one layer to the next layer and through the thickness of the silica glass article. For example, a first layer 130 can include at least one dopant such as, but not limited to, titania, germania and oxides thereof, metal selenides or sulfides (e.g., ZnS or ZnSe), combinations thereof, and the like, whereas a second layer 132 can be free of such dopants, contain different dopants than those present in first layer 130, or have the same composition as first layer 130. In one non-limiting example, second radome 102 comprises multiple layers that are substantially parallel to inner surface 110 and outer surface 120. Physical, optical, and electrical properties of the silica glass article such as dielectric constant, transmission loss, bandwidth, and polarization, can be varied by adjusting the composition of the silica glass article through its thickness and/or from layer to layer. The infrared (IR) transmission of silica glass second radome 102 can, for example be increased by adding germania to selected regions of the radome 102.

In some embodiments, the fused silica glass articles described herein may comprise multiple layers of differing density, as schematically shown for a third radome 104 in FIG. 1c. Third radome 104 comprises an outer layer 140, intermediate layer 144, and an inner layer 142. Outer layer 140 and inner layer 142 comprise porous fused silica that is partially sintered. Outer layer 140 and inner layer 142 may be sintered to the same degree and thus have densities and porosities that at substantially equal to each other. Alternatively, outer layer 140 and inner layer 142 may be sintered to different degrees and thus have densities and porosities that are different from each other. Inner layer 142 and outer layer 140 are separated by intermediate layer 144, which is fully sintered. Intermediate layer 144 serves as a "hermetic" layer to protect communication or sensor equipment (not shown) from moisture, dust, or the like. Third radome 104 may further include composite plugs 146 at the base 148 of third radome 104 to provide mounting strength for third radome 104. In other embodiments, the fused silica glass article may have a density that varies along at least one axis—such as, for example, the longitudinal axis A in FIG. 2—of the glass article.

A method and system/apparatus for making the near-net shape or net shape fused silica glass articles described herein are also provided. The method comprises: providing a mandrel having a shape that is complementary or corresponding to the near-net shape; providing silica soot particles; depositing the silica soot particles to form a silica soot body comprising the silica soot particles, and at least partially sintering the silica soot body in situ on the mandrel to form the fused silica glass article. In the embodiment schematically shown in FIG. 2, apparatus/system 200 comprises an induction coil 220, mandrel 210 (also referred to herein as a "target/substrate") and at least one burner 300. In the embodiment shown in FIG. 3, mandrel 210 is located between induction coil 220 and at least one burner 300.

Mandrel 210 has a shape corresponding or complementary to the desired shape of fused silica article 100; i.e., glass article 100, when formed takes on the shape or contour of the outer surface 212 of mandrel 210. In some embodiments, the mandrel 210 is capable of inductively coupling to induction coils 220 of an induction heating source/power supply (not shown), such as those radio frequency (RF) induction heating sources/power supplies or the like that are known in the art. In one embodiment, the mandrel 210 is formed from graphite, although other susceptor materials, such as ceramic materials or the like, that are stable at temperatures greater than about 1200° C. can also be used. In some embodiments, mandrel 210 is rotatable about axis A to allow for even formation of multiple layers of fused silica on mandrel 210. In one non-limiting example, mandrel 210 is rotatable about axis A at speeds of up to 60 revolutions per minute. Alternatively, mandrel 210 is horizontally and/or vertically translatable by those means known in the art.

The at least one burner 300 is burner that is known in the art for generating a flame 310 in which silica soot and/or doped silica soot is formed by either combustion or flame hydrolysis. In some embodiments, the at least one burner 300 comprises an array or multiple arrays of burners that are known in the art to maximize coverage of mandrel 210 with silica soot and ensure homogeneous deposition of silica soot on mandrel. The at least one burner 300 is capable of delivering oxidizer, fuel, and silicon-bearing (and, in some embodiments, dopant-bearing) precursors and generating a flame 315 in which the silicon-bearing and dopant-bearing precursors, are either hydrolyzed or combusted in flame 310 to form silica soot that is then deposited on mandrel 210. The at least one burner 300 is oriented so as to direct silica soot formed in flame 315 toward surface 212 of mandrel 210 and is translatable so as to deposit silica soot evenly along the length of mandrel 210. Apparatus/system 200 can optionally include a containment vessel or chamber 400 that houses mandrel 210, induction coil 220, and at least one burner 300. At least one additional density-controlling apparatus, such as gas/oxygen external burners 320, may be optionally provided. Containment vessel 400 allows the deposition of silica soot on mandrel 210 to be carried out in a controlled environment—e.g., a low moisture atmosphere—thus avoiding inadvertent contamination of fused silica glass article 100 during formation. In those embodiments in which mandrel 210 is capable of being inductively heated, the induction heating source/power supply, in some embodiments, provides sufficient power to induction coils 220 to inductively heat the surface 212 of the mandrel 210 to a temperature that is sufficient to instantaneously sinter silica soot particles that are deposited on a surface of the mandrel 210. In one non-limiting example the induction heating source/power supply is a 7.5 kW power supply, and induction coils are conical in shape. To achieve instantaneous sintering of the silica soot particles in situ, the susceptor mandrel 210 is, in some embodiments, typically heated to a temperature in a range from about 1200° C. up to about 1900° C.

The method of making fused silica article 100 comprises first providing a mandrel 210, as described hereinabove. Mandrel 210 is then optionally heated to a temperature (e.g., range from about 1200° C. up to about 1900° C.) that is sufficient to instantaneously sinter or consolidate silica soot particles that are deposited on a surface 212 of mandrel 210. In some embodiments, however, the deposition temperature and optional additional external heating (e.g., by burners 320) is sufficient to achieve the desired density without heating mandrel 210 inductively or otherwise. While the mandrel 210 is optionally heated to the temperature, silica soot particles 310 are provided to the surface 212 of the mandrel 210 to form, in some embodiments, a silica soot body. In other embodiments, the deposited silica soot particles are instantaneously sintered or consolidated on surface 212 to form the fused silica glass article 100 on mandrel 210. Subsequent layers of silica soot are deposited and sintered on the consolidated glass to form glass article 100 having a desired thickness.

The silica soot can be produced using those processes that are known in the art including, but not limited to combustion and/or flame hydrolysis of silicon-containing precursors, chemical vapor deposition, and the like, and deposited on the mandrel. In one non-limiting example, porous silica soot can be deposited on the mandrel by outside vapor deposition (OVD) and the direct-to-glass process, in which silica soot particles are directly formed into transparent glass in situ on the mandrel without the intermediate step of forming a porous soot preform.

In the direct-to-glass method, a gas stream comprising a silicon-containing compound either in vapor form or as an atomized liquid is provided and introduced in a flame 315 that is produced by at least one burner 300. As it passes through flame 315, the silicon-containing compound is converted to silica soot through thermal decomposition with oxidation (combustion) or flame hydrolysis to form amorphous particles of fused silica soot, which deposit on mandrel 210.

Various silicon precursor compounds that are known in the art, such as silicon halides, organosilicon compounds, and the like can be employed to produce the silica glass in these processes, as can those burners 300, oxidizers and fuels that are known in the art. Examples of silicon-containing precursors include, but are not limited to, silicon halides (e.g., $SiCl_4$) and halide-free cyclosiloxane compounds, including polymethylsiloxanes such as hexamethyldisiloxanes, polymethylcyclosiloxane, octamethylcyclotetrasiloxane (OMCTS), decamethylcyclopentasiloxane, hexamethylcyclotrisiloxane, mixtures thereof, and the like. These processes described herein can, in some embodiments, also be plasma-assisted.

In some embodiments, the steps of depositing silica soot to form the silica soot body and sintering the silica soot body to form the fused silica article 100 on the heated mandrel 210 comprise sequentially depositing and sintering multiple layers of fused silica on the mandrel 210. As previously described herein, these multiple layers 130, 132 are substantially parallel to each other and to the inner surface 110 and the outer surface 120 of the glass article. In some embodiments, adjacent layers of fused silica having different compositions are formed by introducing precursors for various dopants into the vapor deposition burners 300 that are used to generate silica soot 310. Non-limiting examples of precursors for the various dopants include halides (e.g., $TiCl_4$, $GeCl_4$) and organosilicon compounds such as those previously described herein that include the desired dopant or dopants. Alternatively, dopants such as zinc sulfides and/or selenides can be provided in vapor form to glass article 100 during fabrication, either through burner 300, by introduction into the stream of soot particles 310, or directly to the surface of glass article 100 during fabrication. As additional silica soot particles are deposited and sintered to form the fused silica glass article, multiple layers 130, 132 are consolidated into the body of fused silica glass article.

In one embodiment, the steps of depositing and sintering the silica soot body to form the fused silica article 100 include depositing an outer layer (120 in FIG. 1) that is under compression. Such an outer layer can be formed, for example, by doping the outer layer with up to about 10 wt % titania, which can be achieved by introducing a titanium-containing precursor (e.g., titanium halides such as $TiCl_4$ or the like) into the combustion flame 310 generated by burner 300.

Following deposition and sintering of the silica soot or silica soot body to form the fused silica article 100, fused silica article 100 and mandrel 210 are either actively or passively cooled and fused silica article 100 is removed from mandrel 210. Fused silica article 100 can then undergo further finishing, which can include those finishing steps known in the art such as, for example, localized laser treatment to close microcracks or microflaws on the surfaces of the article.

A flow chart for an exemplary method 500 of depositing a near-net shape glass article is shown in FIG. 3. In a first step 510, a three-dimensional target, such as mandrel 210 (FIG. 2), is provided and mounted on a rotatable stage (step 520). The mounted target is rotated (step 530) as a soot stream is provided and directed at the target (step 540). The soot stream traverses across the target as the target rotates (step 550). In some embodiments, the distance from the burner 300 to target (mandrel 210 in FIG. 2) is adjusted or selected to control the soot density based on the shape of the target (step 560). Steps 530-560 are carried out—i.e., multiple traverses/passes with the soot stream may be made—until a three-dimensional soot body of desired thickness is deposited on the substrate (step 570). The composition, thickness, deposition rate, and/or density of the material deposited on the target may be modified by altering deposition parameters such as traverse speed, burner-to-target distance, and burner flows.

Figure 4:
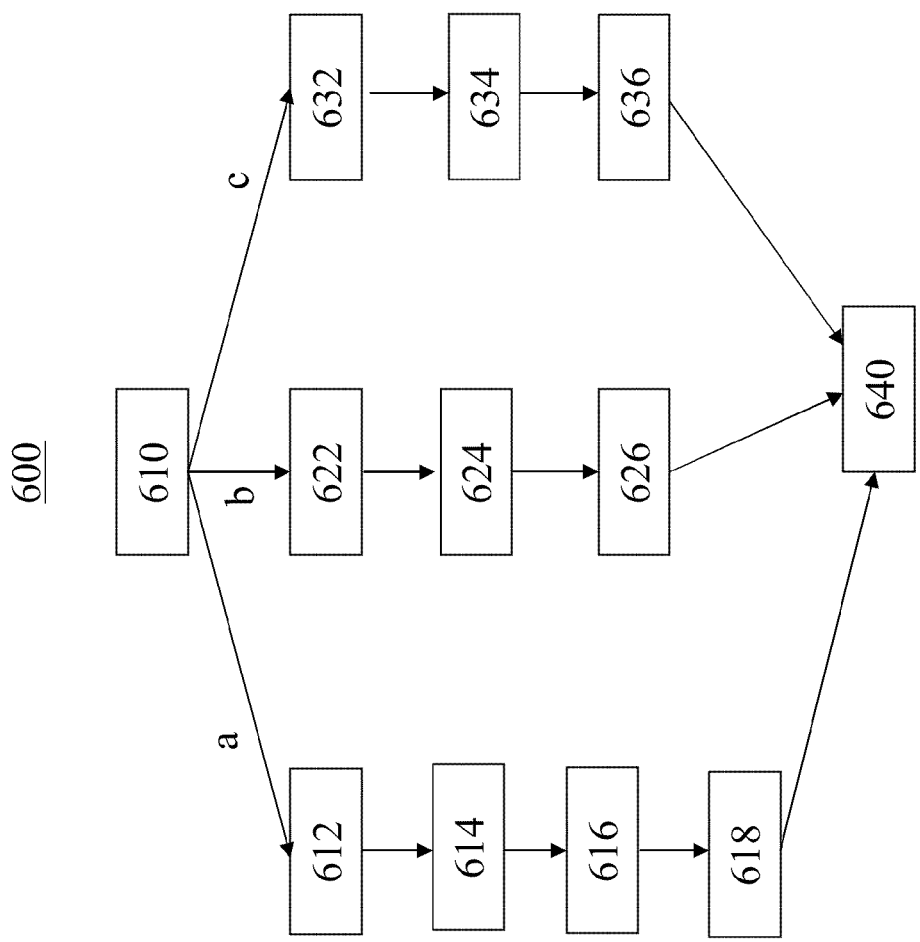
FIG. 4 is a flow chart for methods of sintering a near-net shape fused silica article.

Flow charts illustrating three methods 600 of sintering the silica soot body deposited on the target/substrate 610 are shown FIG. 4. In the first method (a in FIG. 4), the silica soot body is sintered by heating the silica soot body from the interface to release the silica soot body from the substrate surface (step 612). In step 612, the target/substrate is inductively heated and rotated relative to the induction coil (step 614). The silica soot body is rotated with respect to the target/substrate (step 616). Power is applied to the induction coil until sintering of the soot body occurs at the face of the target/substrate and proceeds outward toward the free surface of the soot body (step 618). The sintered body may then be removed from the target/substrate (step 640) by, for example, twisting and pulling the body. Sintering of the silica soot body to form the fused silica article may, in some embodiments, be partial so as to maintain a desired level of porosity, whereas in other embodiments, the fused silica article may be fully sintered. The primary method for sintering the three dimensional shape is to heat the target/substrate such that the silica soot adjacent to the target/substrate sinters first and the sintering front proceeds outward to the free surface of the deposited silica soot body. This outward progression of the sintering front provides a free path of escape for any gases trapped in the silica soot body.

In another embodiment (method b in FIG. 4), the soot body is sintered inwardly—i.e., from the free surface into the interface with the target/substrate—by heating the soot body with a heat source such as, for example, a hydrogen/oxygen torch (step 622). The target/substrate is rotated relative to the flame generated by the torch (step 624) and the flame is traversed across the silica soot body (step 626). The sintered body may then be removed from the target/substrate (step 640) by, for example, twisting and pulling the body. Step 626 may optionally be repeated until the entire silica soot body is sintered before removal from the target/substrate (step 640). By initially sintering the silica soot body at the free surface, gases are trapped within the silica soot body underneath the free surface. These trapped gases create bubbles in the sintered body if one attempts to sinter the body through its entire the thickness. This method may be used to obtain a near-net shape having a glassy surface with an internal soot structure.

In yet another embodiment (method c in FIG. 4), the silica soot body is sintered by bulk heating of the silica soot body in a resistance furnace or oven (step 632). Here, the silica soot body is sintered in either an inert atmosphere or in a vacuum (step 634) to remove all oxygen from the environment, and the furnace is heated or "ramped" to the sintering temperature, held at that temperature until the body is sintered, and then cooled by ramping down the furnace temperature (step 636). The sintered body may then be removed from the target/substrate (step 640).

The fused silica glass article and, particularly, the fused silica glass radome described herein have high temperature performance that is superior to that of materials such as spin- or slip-cast fused silica and ceramic glasses that are currently used in such applications. By providing an outer layer or surface having a CTE that approaches or equals zero, thermal shock failures are eliminated. The vapor deposition of silica soot enables the composition to be controlled and, if desired, altered more precisely during formation of the fused silica article, and the use of the mandrel 210 enables the degree of sintering to be adjusted as a function of thickness, thus increasing design flexibility beyond that of slip- or spin-cast materials.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. A method of making a fused silica glass article having a near-net shape, the method comprising the steps of:
   a. providing a mandrel, the mandrel having a shape that is complementary to the near-net shape, wherein the mandrel acts as a susceptor for radio-frequency radiation;
   b. providing silica soot particles;
   c. depositing the silica soot particles in situ on the mandrel to form a silica soot body, the silica soot body comprising the silica soot particles;
   d. inductively heating the mandrel with radio frequency radiation to a temperature in a range from about 1200° C. up to about 1900° C.; and
   e. sintering the silica soot body in situ on the mandrel to form the fused silica glass article.

2. The method of claim 1, wherein the mandrel is a graphite mandrel.

3. The method of claim 1, wherein the near-net shape is a radome or a crucible.

4. The method of claim 1, wherein the step of depositing the silica soot particles on the mandrel comprises depositing an outer layer on the silica soot body, wherein the outer layer is under compression.

5. The method of claim 1, wherein the step of providing the soot particles comprises generating the soot particles by flame hydrolysis of a silicon-containing precursor or by combustion of a silicon-containing precursor.

6. The method of claim 1, wherein the step of providing the silica soot particles comprises generating the silica soot particles by combustion of a silicon-containing precursor.

7. The method of claim 1, wherein sintering the silica soot body comprises sintering the silica soot body simultaneously with depositing the silica soot particles.

8. The method of claim 1, wherein sintering the silica soot body comprises heating the silica soot body at an interface between the mandrel and the silica soot body to sinter the silica soot body at the interface.

9. The method of claim 1, wherein sintering the silica soot body comprises heating the silica soot body at a free surface to sinter the silica soot body at the free surface, the free surface being distal from an interface between the mandrel and the silica soot body.

10. The method of claim 1, wherein sintering the silica soot body comprises heating the silica soot body in a resistance furnace or an oven.

11. The method of claim 1, wherein depositing the silica soot particles on the mandrel comprises depositing a first layer of silica soot particles having a first density on the mandrel and depositing a second layer of silica soot particles having a second density on the first layer, wherein the first density differs from the second density.

12. The method of claim 1, wherein the fused silica particle has a density that varies along an axis of the fused silica article.

13. The method of claim 1, wherein depositing the silica soot particles on the mandrel comprises depositing a first layer of silica soot particles having a first composition on the mandrel and depositing a second layer of silica soot particles having a second composition on the first layer, wherein the first composition differs from the second composition.

14. The method of claim 13, wherein one of the first composition and the second composition comprises at least one dopant.

15. The method of claim 14, wherein the at least one dopant includes at least one of titania, germania, zinc sulfide, zinc selenide, and combinations thereof.

16. The method of claim 15, wherein the outer layer comprises up to 8 percent titania by weight.

* * * * *